(12) United States Patent
Arakawa

(10) Patent No.: US 7,247,873 B2
(45) Date of Patent: Jul. 24, 2007

(54) QUALITY CONTROL SYSTEM FOR IRRADIATION APPARATUS

(75) Inventor: Satoshi Arakawa, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/807,373

(22) Filed: Mar. 24, 2004

(65) Prior Publication Data

US 2004/0188645 A1    Sep. 30, 2004

(30) Foreign Application Priority Data

Mar. 25, 2003    (JP)    ............................. 2003-083122

(51) Int. Cl.
*A61B 6/08* (2006.01)
*G01N 23/04* (2006.01)
*G03B 42/08* (2006.01)
*G11B 7/135* (2006.01)
*G12B 13/00* (2006.01)

(52) U.S. Cl. .................. 250/583; 250/252.1; 250/585; 250/586; 378/206

(58) Field of Classification Search ........ 250/580–582, 250/584–587, 484.4, 491.1; 604/20; 606/2, 606/33, 130; 607/154; 378/65, 205, 207, 378/206, 162
See application file for complete search history.

(56) References Cited

U.S. PATENT DOCUMENTS

| | | | | |
|---|---|---|---|---|
| 3,909,616 A | * | 9/1975 | Redfield et al. ............ | 378/147 |
| 4,837,436 A | * | 6/1989 | Whiting ....................... | 250/585 |
| 5,684,854 A | * | 11/1997 | Hughes ....................... | 378/206 |
| 5,892,840 A | * | 4/1999 | Jang et al. ................... | 382/132 |
| 6,267,502 B1 | * | 7/2001 | McNeirney et al. ........ | 378/206 |
| 6,478,462 B2 | * | 11/2002 | Polkus et al. ............... | 378/207 |
| 6,626,569 B2 | * | 9/2003 | Reinstein et al. ........... | 378/206 |
| 6,783,275 B2 | * | 8/2004 | Ghelmansarai ............. | 378/206 |

FOREIGN PATENT DOCUMENTS

JP    2593412 Y2    2/1999

* cited by examiner

*Primary Examiner*—David Porta
*Assistant Examiner*—Frederick F. Rosenberger
(74) *Attorney, Agent, or Firm*—Sughrue Mion, PLLC

(57) ABSTRACT

A quality control system for an irradiation apparatus includes a radiation image reading system. The radiation image reading system reads out a radiation image from a stimulable phosphor panel which is disposed in a predetermined position to receive irradiation of position check radiation from an irradiation system and irradiation of uniform radiation from the irradiation system to an area larger than the area exposed to the position check radiation and to receive irradiation of position check light in a visible region from a position check light irradiation system after receiving the irradiation of the uniform radiation and to form a radiation image. A relative position obtaining system obtains the relation between the irradiating position of the position check radiation and the irradiating position of the position check light on the basis of the radiation image read by the radiation image reading system.

6 Claims, 10 Drawing Sheets

QUALITY CONTROL SYSTEM FOR IRRADIATION APPARATUS

BACKGROUND OF THE INVENTION

1. Field of the Invention

This invention relates to a quality control system for an irradiation apparatus, and more particularly to a quality control system for checking a position exposed to the radiation in an irradiation apparatus.

2. Description of the Related Art

There have been known a radiotherapy system in which a lesion is treated by concentrating radiation on the lesion, as disclosed, for instance, in Japanese Utility Model Publication No. 2593412 and "Zukai Shinryo-hoshasen Gijutu Jissen Gaido (Illustrated Radiodiagnosis Practice Guide)" (2002) Kabushiki Gaisha Kobundo. In such a system, after the position of the lesion is adjusted so that the lesion is on the optical path of a position check light which is arranged to propagate along the same optical path as the treatment radiation, the treatment radiation is applied to the lesion, whereby the treatment radiation is accurately applied to the lesion.

The tolerance of the irradiating position (the position exposed to the radiation) is within several millimeters, and whether deviation of the optical path of the position check light from the optical path of the treatment radiation (will be simply referred to as "the optical path deviation", hereinbelow) is within the tolerance where the deviation does not cause any trouble in the radiotherapy is checked each time the radiotherapy system is operated. Whether the optical path deviation is within the tolerance can be checked, for instance, by preparing an X-ray film with a central hole, visually positioning the X-ray film so that the central hole is aligned with the center of the bundle of the position check light, applying to the X-ray film position check radiation which propagates along the optical path identical to that of the treatment radiation, and reading the relation between the position of the central hole and the position in which the X-ray film is exposed to the position check radiation.

In order to ensure that the optical path deviation is within several millimeters, it is desired that the accuracy of measurement of the optical path deviation is higher than the value by one figure. However, it is troublesome operation to accurately position the X-ray film so that the central hole is aligned with the center of the bundle of the position check light, whereby the efficiency of operation of radiotherapy deteriorates and at the same time, the reliability of measurement of the optical path deviation becomes unsatisfactory.

SUMMARY OF THE INVENTION

In view of the foregoing observations and description, the primary object of the present invention is to provide a quality control system for an irradiation apparatus which can more easily and more accurately check the relation between the irradiating position of the position check radiation and the irradiating position of the position check light.

In accordance with a first aspect of the present invention, there is provided a quality control system for an irradiation apparatus comprising a radiation image reading means which reads out a radiation image from a stimulable phosphor panel which is disposed in a predetermined position to receive irradiation of position check radiation from an irradiation means and irradiation of uniform radiation from the irradiation means to an area larger than the area exposed to the position check radiation and to receive irradiation of position check light in a visible region from a position check light irradiation means after receiving the irradiation of the uniform radiation and to form a radiation image, and a relative position obtaining means which obtains the relation between the irradiating position of the position check radiation and the irradiating position of the position check light on the basis of the radiation image read by the radiation image reading means.

In accordance with a second aspect of the present invention, there is provided a quality control system for an irradiation apparatus comprising a radiation image reading means which reads out a radiation image from a stimulable phosphor panel which is disposed in a predetermined position to receive irradiation of position check light in a visible region having an irradiating position marker from a position check light irradiation means after receiving the irradiation of position check radiation from an irradiation means and to form a radiation image, and a relative position obtaining means which obtains the relation between the irradiating position of the position check radiation and the irradiating position of the position check light on the basis of the radiation image read by the radiation image reading means.

The position check light having an irradiating position marker makes a particular mark by the area of the stimulable phosphor panel exposed to the position check light and the area of the stimulable phosphor panel not exposed to the position check light when the stimulable phosphor panel is irradiated with the position check light so that an area of the irradiating area of the position check light is more accurately identified. For example, such position check light having an irradiating position marker can be generated by providing a mask, having an area which cuts the position check light and an area which transmits the position check light, in front of a light source generating the position check light.

The position check radiation and the position check light are applied to the stimulable phosphor panel respectively by the irradiation means and the position check light irradiation means so that the relative positions of the position check radiation and the position check light on the stimulable phosphor panel can be detected. For example, it is preferred that the centers of the areas of the stimulable phosphor panel exposed to the position check radiation and the position check light can be checked or the relative inclinations of the areas can be checked.

When certain kinds of phosphors are exposed to radiation such as X-rays, they store a part of energy of the radiation. Then when the phosphors which have been exposed to the radiation are exposed to stimulating light such as visible light, light is emitted from the phosphors in proportion to the stored energy of the radiation. Phosphors exhibiting such properties are generally referred to as "stimulable phosphors". In this specification, the light emitted from the stimulable phosphors upon stimulation thereof will be referred to as "stimulated emission". The stimulable phosphor panel is a recording medium using a stimulable phosphor and comprises a stimulable phosphor layer formed on a substrate.

In the quality control system for an irradiation apparatus in accordance with the first aspect of the present invention, radiation energy is stored in the areas of the stimulable phosphor panel exposed to the position check radiation and to the position check light in different levels, whereby the relation between the irradiating position of the position check radiation and the irradiating position of the position check light can be obtained by reading the radiation image on the stimulable phosphor panel. Accordingly, factors deteriorating the accuracy of obtaining the relative positions such as adjustment of the alignment of the central hole in the X-ray film and the center of the bundle of the position check light, can be removed, whereby the relative positions can be more accurately obtained from the radiation image, and the reliability and the efficiency of checking the optical path deviation is within the tolerance where the deviation does not cause any trouble in the radiotherapy.

In the quality control system for an irradiation apparatus in accordance with the second aspect of the present invention, an area where radiation energy is stored in different levels corresponding to the irradiating position marker (formed by the area of the stimulable phosphor panel exposed to the position check light and the area of the stimulable phosphor panel not exposed to the position check light) can be formed in the area of the stimulable phosphor panel exposed to the position check radiation, whereby the relation between the irradiating position of the position check radiation and the irradiating position of the position check light can be obtained by reading the radiation image on the stimulable phosphor panel. Accordingly, factors deteriorating the accuracy of obtaining the relative positions such as adjustment of the alignment of the central hole in the X-ray film and the center of the bundle of the position check light, can be removed, whereby the relative positions can be more accurately obtained from the radiation image, and the reliability and the efficiency of checking the optical path deviation is within the tolerance where the deviation does not cause any trouble in the radiotherapy.

DESCRIPTION OF THE PREFERRED EMBODIMENT

Figure 1:
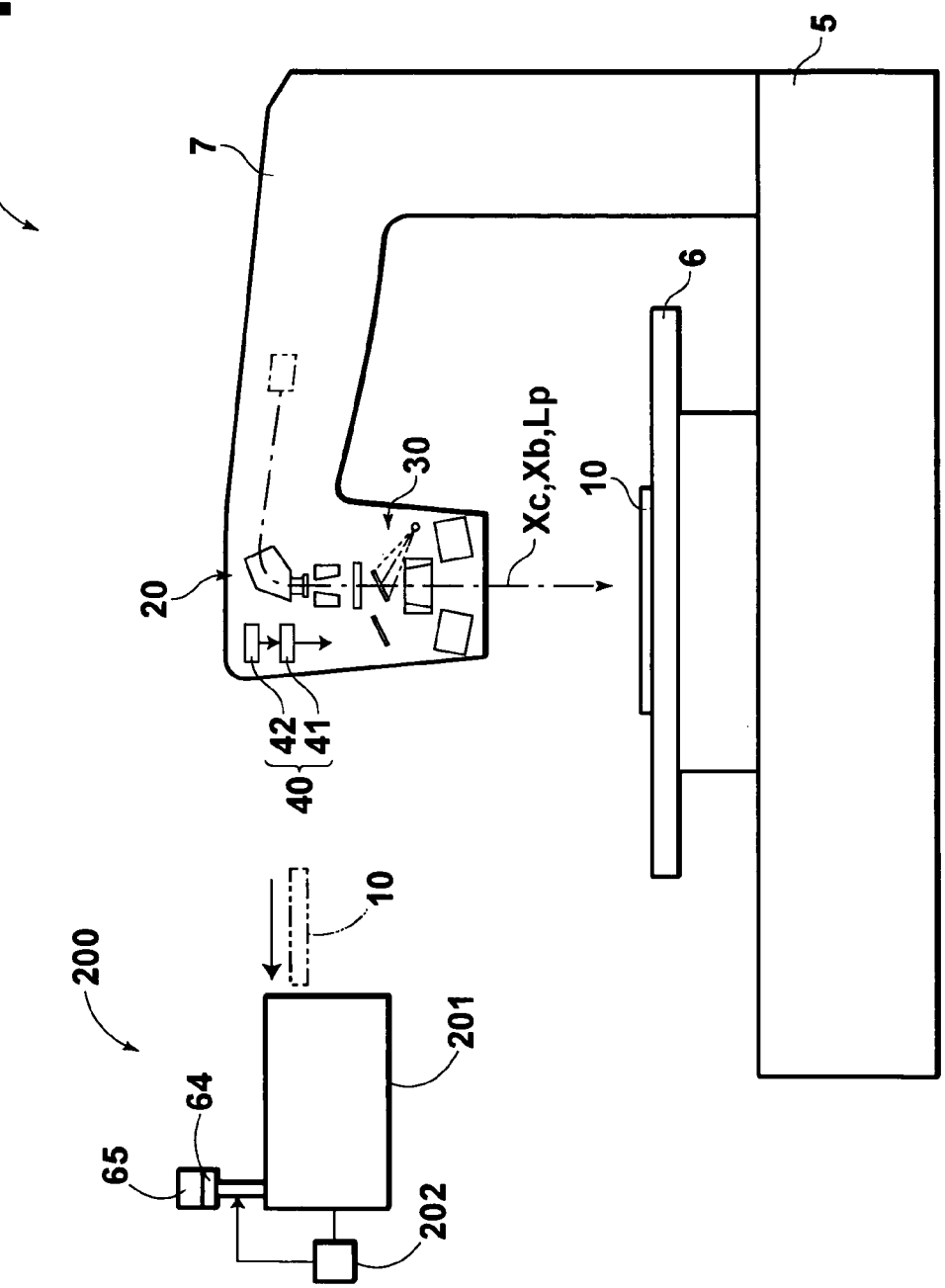
FIG. 1 is a side view showing in brief the arrangement of the quality control system for an irradiation apparatus in accordance with an embodiment of the present invention.

A quality control system 200 in accordance with an embodiment of the present invention comprises a radiation image reading system 201 which reads out a radiation image from a stimulable phosphor panel 10 which is disposed in a predetermined position in a radiotherapy system (an irradiation apparatus) 100 to receive irradiation of position check radiation Xc from an irradiation system 20 of the radiotherapy system 100 and irradiation of uniform radiation Xb from the irradiation system 20 to an area larger than the area exposed to the position check radiation Xc and to receive irradiation of position check light Lp in a visible region from a position check light irradiation system 30 after receiving the irradiation of the uniform radiation Xb, thereby forming a radiation image, and a relative position obtaining system 202 which obtains the relation between the irradiating position of the position check radiation Xc and the irradiating position of the position check light Lp on the basis of the radiation image read by the radiation image reading system 201.

The radiation image reading system 201 may comprise, for instance, a known radiation image read-out apparatus which reads a radiation image recorded on a stimulable phosphor panel by conveying the stimulable phosphor panel in a sub-scanning direction while causing stimulating light to scan the stimulable phosphor panel in a main scanning direction and outputs image data representing the radiation image. The relative position obtaining system 202 receives the image data from the radiation image reading system 201 and obtains a positional deviation of the irradiating position of the position check light Lp from the irradiating position of the position check radiation Xc (an example of the relation between the irradiating position of the position check radiation and the irradiating position of the position check light).

The radiotherapy system 100 comprises the irradiation system 20, which irradiates, for instance, an X-ray, the position check light irradiation system 30 which irradiates the position check light Lp in a visible region, and a relative position recording means 40.

The relative position recording means 40 causes the irradiation system 20 to apply the position check radiation Xc to the stimulable phosphor panel 10 disposed in a predetermined position, and causes the irradiation system 20 to apply uniform radiation Xb to an area of the stimulable phosphor panel 10 which is larger than the area of the stimulable phosphor panel 10 exposed to the position check radiation Xc and includes the same. Further, the relative position recording means 40 causes the position check light irradiation system 30 to apply the position check light Lp to the stimulable phosphor panel 10 after application of the uniform radiation Xb. Thus, the relative position recording means 40 records on the stimulable phosphor panel 10 the relation between the irradiating position of the position check radiation Xc and the irradiating position of the position check light Lp.

Figure 2:
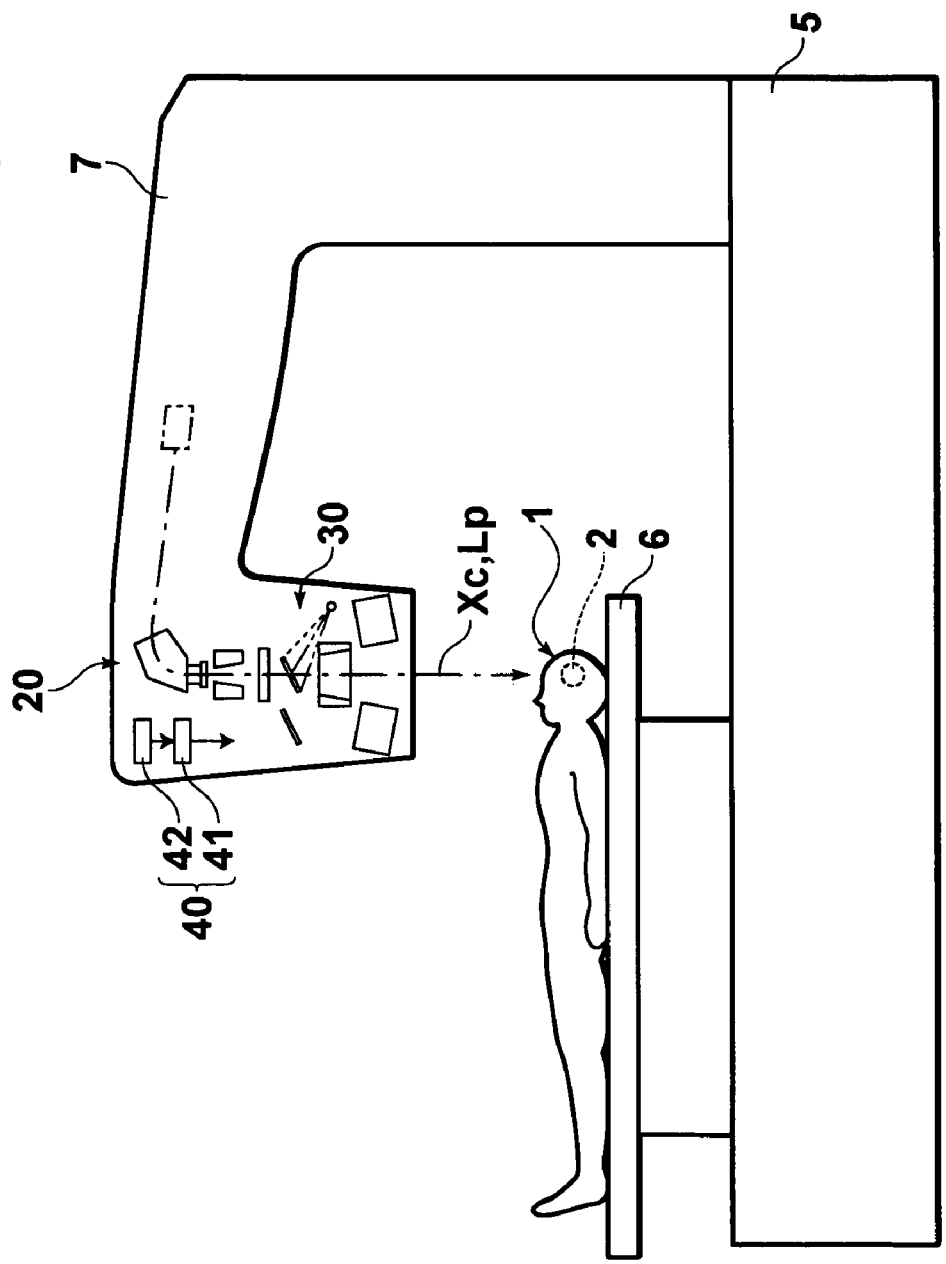
FIG. 2 is a side view showing a manner of irradiating a lesion with radiation by the use of the quality control system.

As shown in FIG. 2, the radiotherapy system 100 comprises a base 5 having a movable table 6 which moves a patient 1 thereon in horizontal directions perpendicular to the direction of the position check radiation Xc and the irradiation system 20 and the position check light irradiation system 30 are supported above the movable table 6 by an arm 7 supported by the base 5. The movable table 6 is moved to bring a lesion 2 of the patient 1 rested thereon into a field irradiated by a treatment X-ray irradiated by the irradiation system 20.

In the radiotherapy system 100, visible position check light which is arranged to propagate along the same optical path as the treatment X-ray is irradiated to the lesion 2 before the treatment X-ray is applied to the lesion 2 in order to adjust the position of the lesion 2 so that the treatment X-ray correctly impinges upon the lesion 2. The treatment X-ray and the position check radiation Xc are arranged to propagate along the same optical path.

Figure 3:
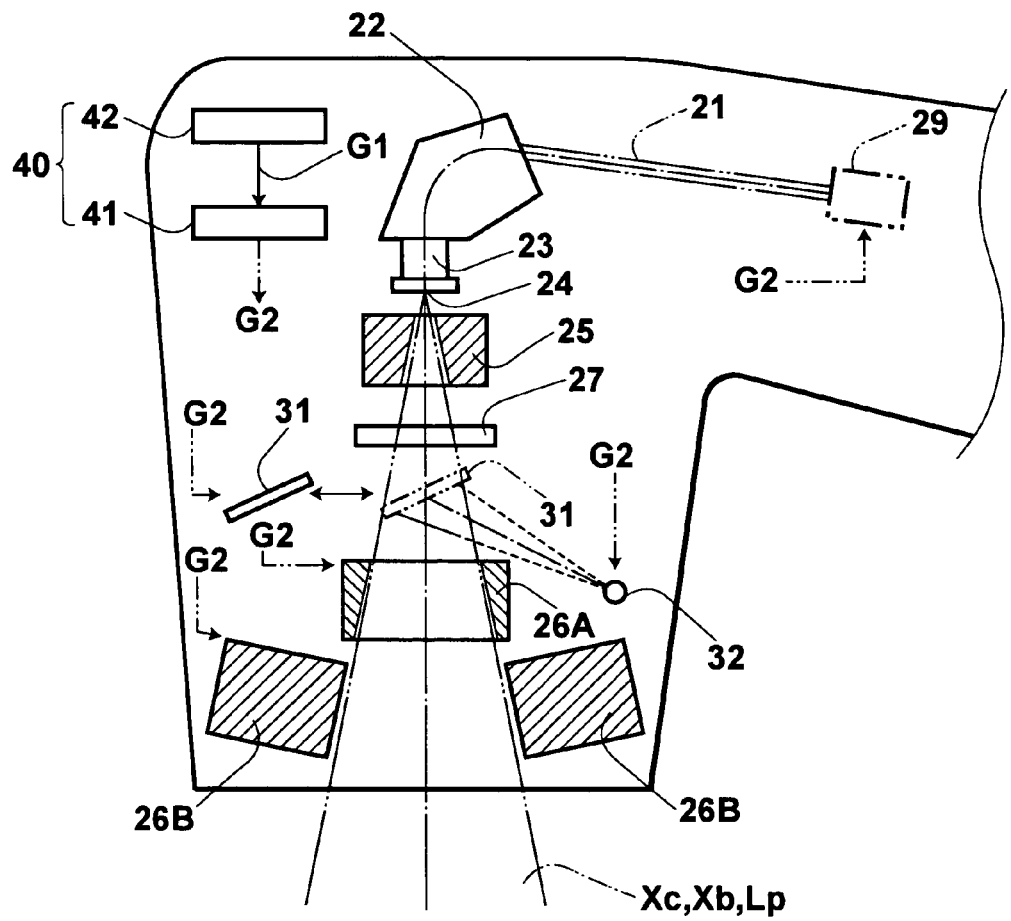
FIG. 3 is an enlarged side view showing the irradiation system and the position check light irradiation system.
Figure 4:
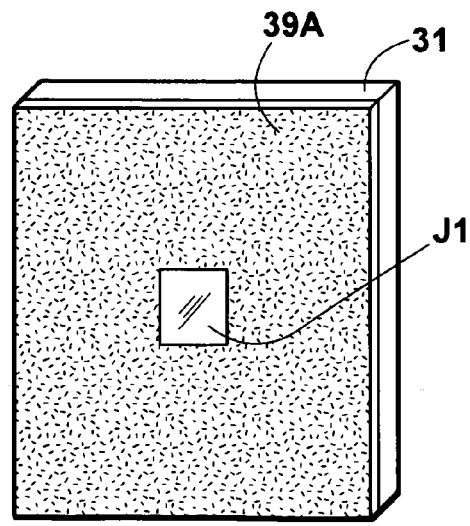
FIG. 4 is a perspective view showing the reflecting mirror provided with the light-shielding mask.

As shown in FIG. 3, the irradiation system 20 comprises an electron beam propagation path 21 which propagates an electron beam generated by an electron beam generator 29, a deflection magnet 22 which deflects the electron beam, a vacuum window 23 disposed at the exit of the deflection magnet 22, an X-ray target 24 which radiates an X-ray upon irradiation with an electron beam passing through the vacuum window 23, a conical collimator 25 which limits the propagation path of the radiated X-ray, a pair of movable collimators 26A and 26B, and a flattening filter 27 disposed between the conical collimator 25 and the movable collimators 26A and 26B. The flattening filter 27 uniforms the distribution of the amount of radiation in the X-ray passing through the conical collimator 25.

Each of the movable collimators 26A and 26B comprises two collimator blocks, and the four collimator blocks are moved in a plane perpendicular to the X-ray propagation path so that the cross-sectional shape of the X-ray propagation path is made similar to the shape of the lesion 2 (the desired shape). That is, the field irradiated with the X-ray is set according to the shape of the target (lesion) 2 to be exposed to the X-ray.

The position check light irradiation system 30 comprises a reflecting mirror 31 which can be inserted into and retracted from the optical path of the X-ray between the movable collimators 26A and 26B and the flattening filter 27 and a visible light source 32 which is disposed in a position optically conjugate with the X-ray target 24 by way of the mirror 31, and position check light Lp radiated from the visible light source 32 is reflected by the mirror 31 to propagate in the same direction as the X-ray. The area in which the mirror 31 reflects the position check light Lp depends on an opening in a light-shielding mask 39A which is attached to the surface of the mirror 31. In this particular embodiment, the light-shielding mask 39A has a rectangular opening and the bundle of the position check light Lp reflected by a rectangular area J1 on the mirror 31 opposed to the rectangular opening is rectangular in cross-section.

The relative position recording means 40 comprises a controller 41 which controls setting whether an X-ray is to be radiated from the irradiation system 20, the amount of X-ray to be radiated, movement of the movable collimators 26A and 26B, turning on the visible light source 32, insertion and retraction of the mirror 31 and the like, and a data storage means 42 which outputs to the controller 41 data G1 such as a control signal or a control program for causing the relative positions of the irradiating position of the position check radiation Xc and the irradiating position of the position check light Lp to be automatically recorded, and the like.

Recording of the relative positions of the irradiating position of the position check radiation Xc and the irradiating position of the position check light Lp, that is, the deviation of the optical path of the position check light from the optical path of the position check radiation (the optical path deviation) will be described, hereinbelow.

Figure 5:
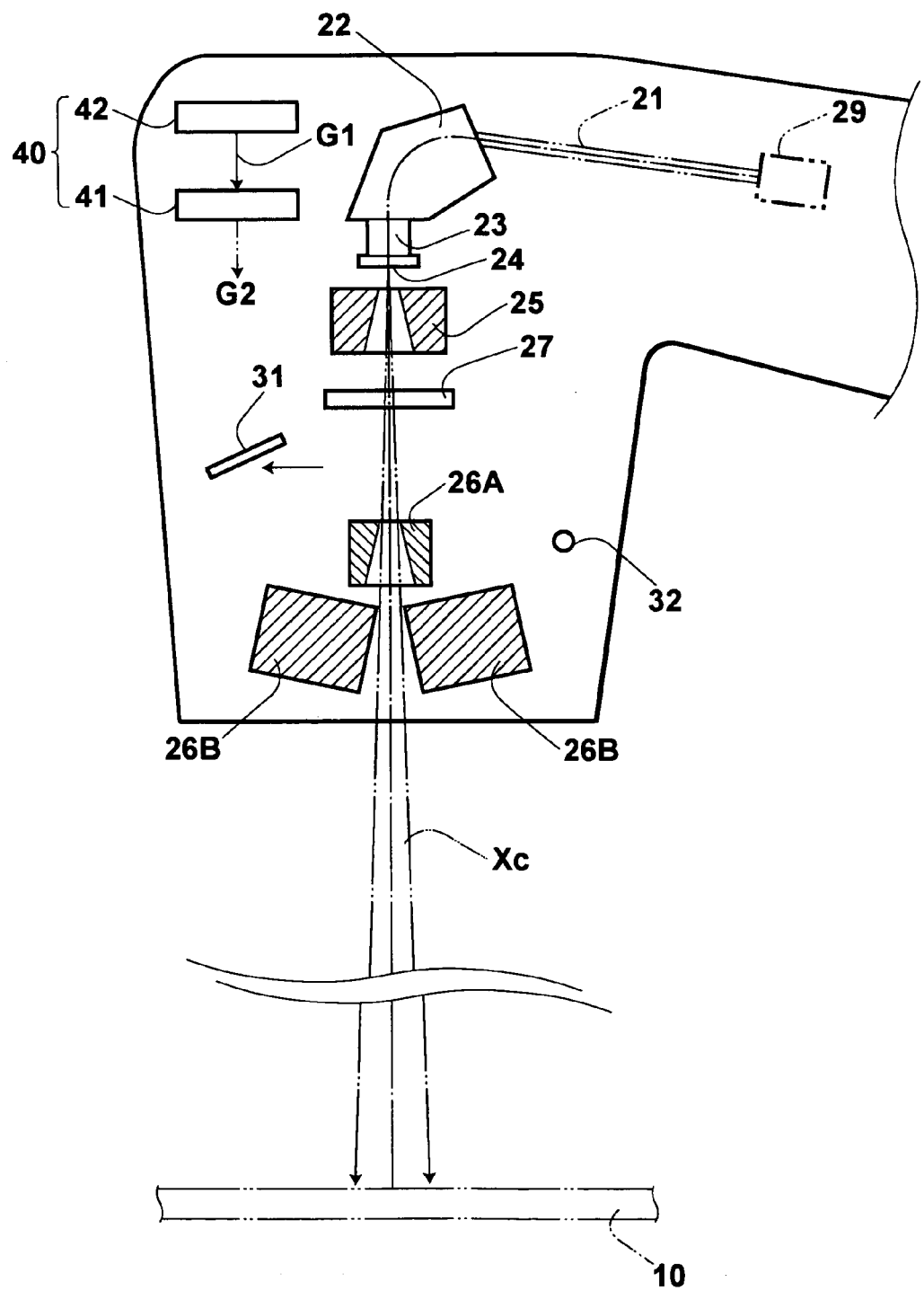
FIG. 5 is an enlarged side view showing a manner of irradiating the stimulable phosphor panel with the position check radiation from the irradiation system.
Figure 6A:
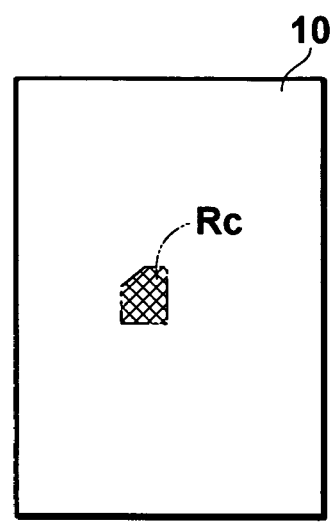
FIGS. 6A to 6C are views showing the areas exposed to the radiation and the visible light recorded on the stimulable phosphor panel.
Figure 6B:
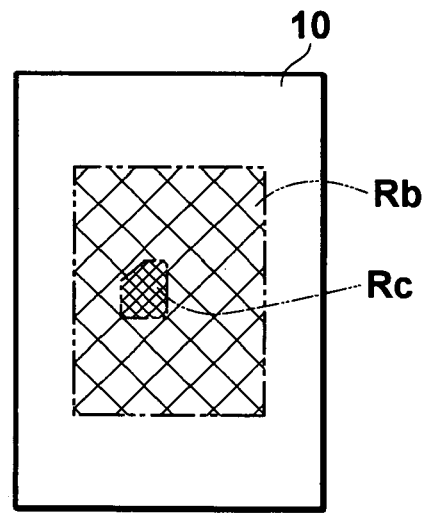
Figure 6C:
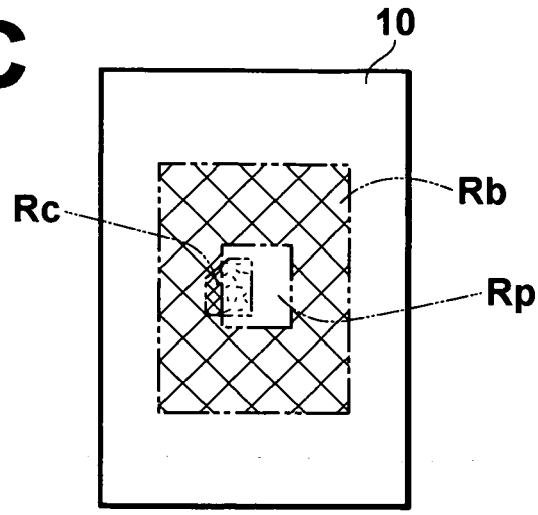
Figure 7:
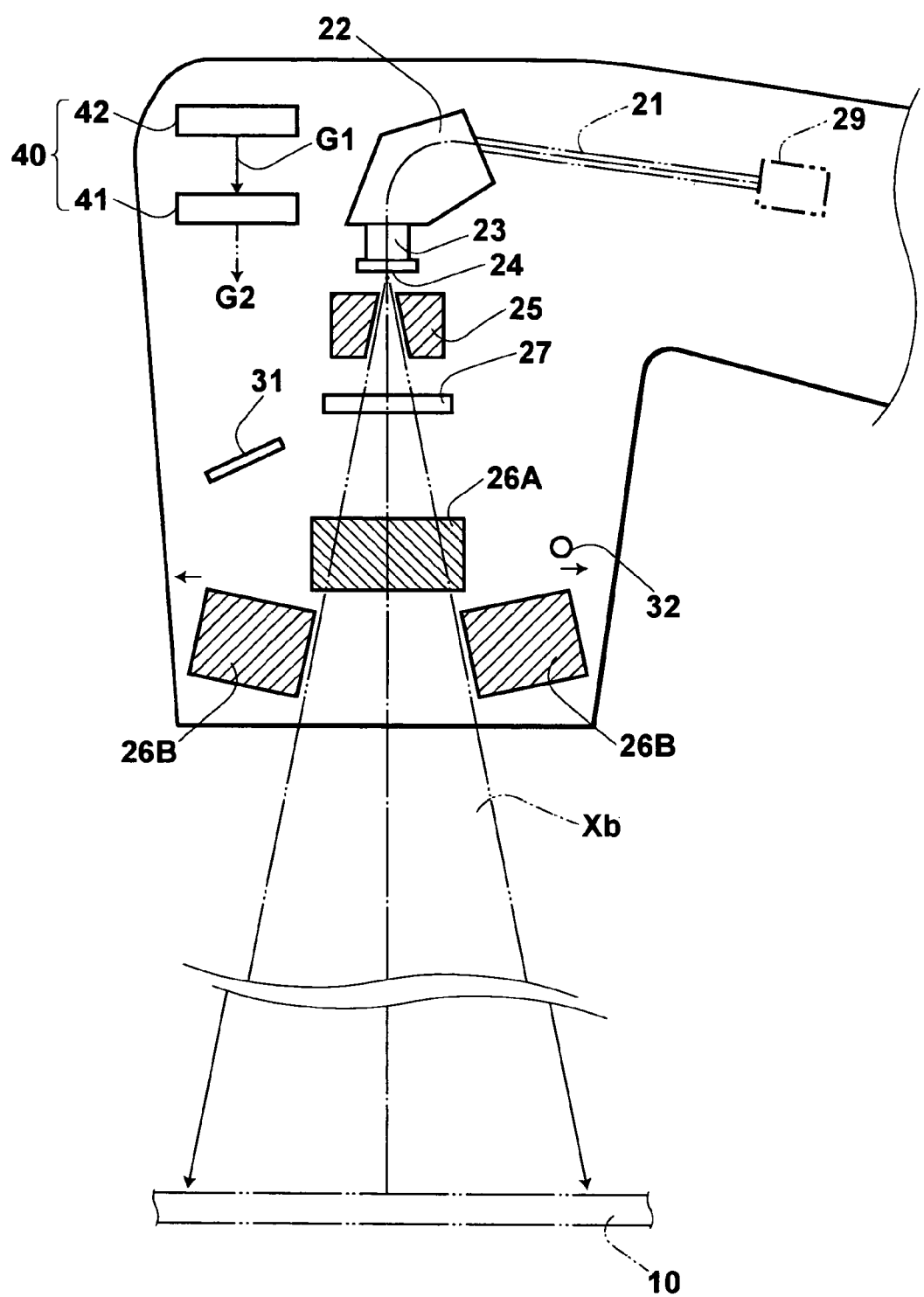
FIG. 7 is an enlarged side view showing a manner of irradiating the stimulable phosphor panel with the uniform radiation from the irradiation system.
Figure 8:
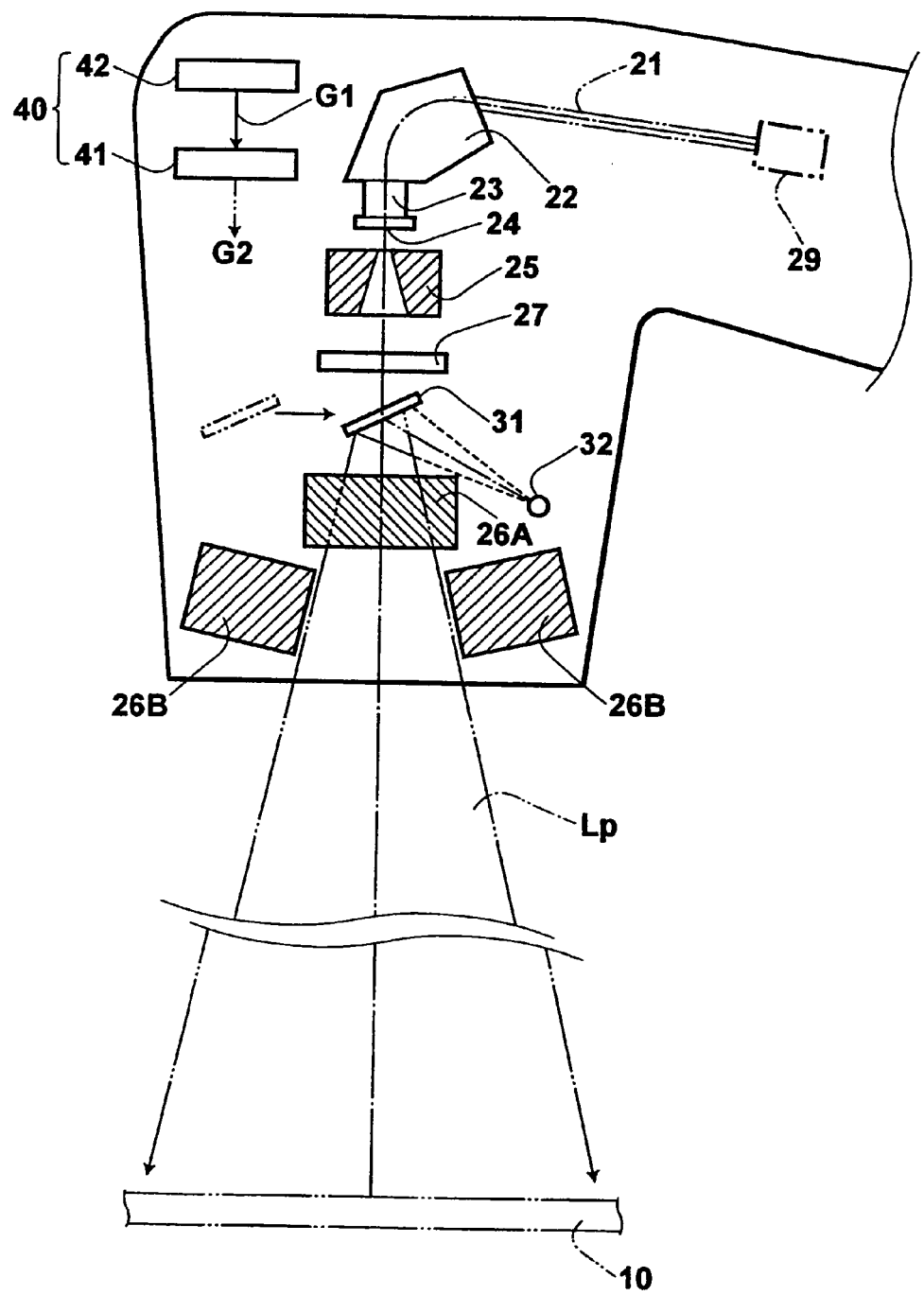
FIG. 8 is an enlarged side view showing a manner of irradiating the stimulable phosphor panel with the position check light from the position check light irradiation system.

FIG. 5 is an enlarged view showing a state where the stimulable phosphor panel 10 is irradiated with the position check radiation from the irradiation system 20, and FIGS. 6A to 6C are views showing areas irradiated with an X-ray and visible light, where FIG. 6A is a view showing the area irradiated with the position check radiation, FIG. 6B is a view showing the area irradiated with the uniform radiation and FIG. 6C is a view showing the area irradiated with the position check light. FIG. 7 is an enlarged view showing a state where the stimulable phosphor panel 10 is irradiated with the uniform radiation from the irradiation system 20, and FIG. 8 is an enlarged view showing a state where the stimulable phosphor panel 10 is irradiated with the position check light from the position check light irradiation system 30.

A stimulable phosphor panel 10 is placed on the movable table 6 and the movable table 6 is moved to bring the stimulable phosphor panel 10 to a predetermined position where the stimulable phosphor panel receives irradiation of an X-ray from the irradiation system 20. (FIG. 1)

Then the data storage means 42 outputs to the controller 41 the data G1 such as a control signal or a control program for automatically recording the relative positions of the irradiating position of the position check radiation Xc and the irradiating position of the position check light Lp on the stimulable phosphor panel 10, and the controller 41 outputs upon receipt of the data G1, for instance, a control signal G2 for executing the following.

That is, first the reflecting mirror 31 is retracted from the optical path of the X-ray and at the same time, the movable collimators 26A and 26B are narrowed as shown in FIG. 5. Thereafter, an electron beam generated by the electron beam generator 29 impinges upon the X-ray target 24 and the X-ray target 24 radiates an X-ray. The X-ray radiated from the X-ray target 24 impinges upon the stimulable phosphor panel 10 through the conical collimator 25, the flattening filter 27 and the narrowed movable collimators 26A and 26B as the position check radiation Xc which is limited in its irradiating area. The area Rc exposed to the position check radiation Xc, e.g., a pentagonal area, is recorded on the stimulable phosphor panel 10 as shown in FIG. 6A.

Thereafter, the movable collimators 26A and 26B are broadened (opened) with the mirror 31 kept retracted from the optical path of the X-ray as shown in FIG. 7. An electron beam generated by the electron beam generator 29 impinges upon the X-ray target 24 and the X-ray target 24 radiates an X-ray. The X-ray radiated from the X-ray target 24 impinges upon the stimulable phosphor panel 10 through the conical collimator 25, the flattening filter 27 and the broadened movable collimators 26A and 26B as the uniform radiation Xb. The uniform radiation Xb irradiates an area of the stimulable phosphor panel 10 which is larger than the area of the stimulable phosphor panel 10 irradiated by the position check radiation Xc and including the same, whereby an area Rb (rectangular in this particular embodiment as shown in FIG. 6B) wider than the area Rc of the stimulable phosphor panel 10 exposed to the position check radiation Xc is recorded over the area of the stimulable phosphor panel 10 irradiated by the position check radiation Xc.

Then, the reflecting mirror 31 is inserted into the optical path of the X-ray with the movable collimators 26A and 26B kept opened as shown in FIG. 8. Then the visible light source 32 is turned on. Position check light Lp radiated from the visible light source 32 is reflected by the reflecting mirror to impinge upon the stimulable phosphor panel 10. Since the light-shielding mask 39A of the reflecting mirror 31 has a rectangular opening in this particular embodiment, the position check light Lp reflected by the mirror 31 irradiates a rectangular area on the stimulable phosphor panel 10 which overlaps the area which the position check radiation Xc and the uniform radiation Xb have irradiated overlapping each other. Stimulated emission is emitted from the rectangular area irradiated by the position check light Lp, whereby a part of the energy stored therein upon exposure to the position check radiation Xc and the uniform radiation Xb is released from the rectangular area. FIG. 6C shows a rectangular area Rp which is irradiated by the position check light and from which a part of the energy stored therein upon exposure to the position check radiation Xc and the uniform radiation Xb is released.

In the above described operation, the relative positions of the irradiating position of the position check radiation Xc and the irradiating position of the position check light Lp are accurately recorded on the stimulable phosphor panel 10.

The stimulable phosphor panel 10 on which the optical path deviation has been recorded is loaded in the radiation image reading system 201 of the quality control system 200 and the radiation image representing the relative positions is read by the radiation image reading system 201. Then image data representing the radiation image read by the radiation image reading system 201 is output to the relative position obtaining system 202.

Figure 9:
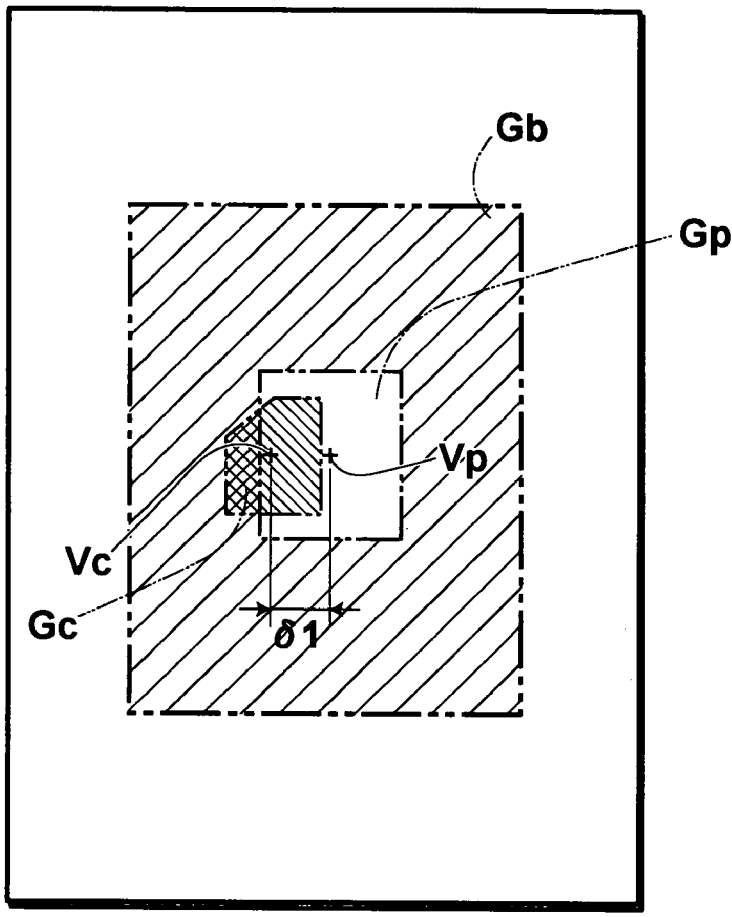
FIG. 9 is a view showing an image read from the stimulable phosphor panel showing the deviation of the irradiating position of the position check light from that of the position check radiation.

The image representing the optical path deviation output to the relative position obtaining system 202 in the form of image data is an image of an image portion Gc representing the area irradiated by the position check radiation Xc, an image portion Gb representing the area irradiated by the uniform radiation Xb and an image portion Gp representing the area irradiated by the position check light Lp overlapping each other as shown in FIG. 9. The relative positions of the center Vc of the image portion Gc representing the area irradiated by the position check radiation Xc and the center Vp of the image portion Gp representing the area irradiated by the position check light Lp represent the optical path deviation.

The relative position obtaining system 202 obtains a positional deviation of the irradiating position of the position check light Lp from the irradiating position of the position check radiation Xc (an example of the relation between the irradiating position of the position check radiation and the irradiating position of the position check light) on the basis of the input radiation image. That is, the space between the centers Vc and Vp is obtained as the positional deviation δ1 as shown in FIG. 9.

The relative position obtaining system 202 further compares the positional deviation δ1 with a predetermined tolerance E. When the former is not larger than the latter, the relative position obtaining system 202 turns on a blue lamp 64 which indicates it has been confirmed that the position check light Lp from the position check light irradiation system 30 can be used as representing the irradiating position of the position check radiation, and when the former is larger than the latter, the relative position obtaining system 202 gives an alarm by turning on a red lamp 65 which indicates it has been confirmed that the position check light Lp from the position check light irradiation system 30 cannot be used as representing the irradiating position of the position check radiation. The blue lamp 64 and the red lamp 65 are disposed in the radiation image reading system 201 as shown in FIG. 1.

The image portion Gp representing the area irradiated by the position check light Lp is an image formed by partly erasing the radiation image recorded on the stimulable phosphor panel 10 by the position check radiation Xc and the uniform radiation Xb, that is, by partly releasing radiation energy stored in the stimulable phosphor panel 10.

Though, in the embodiment described above, irradiation of the position check radiation Xc, irradiation of the uniform radiation Xb and irradiation of the position check light Lp to the stimulable phosphor panel 10 are done in this order, the order in which irradiation of the position check radiation Xc, irradiation of the uniform radiation Xb and irradiation of the position check light Lp to the stimulable phosphor panel 10 are done may be freely varied so long as irradiation of the position check light Lp is done after irradiation of the uniform radiation Xb. For example, irradiation of the position check radiation Xc, irradiation of the uniform radiation Xb and irradiation of the position check light Lp may be done in the order of irradiation of the uniform radiation Xb, irradiation of the position check radiation Xc and irradiation of the position check light Lp, or in the order of irradiation of the uniform radiation Xb, irradiation of the position check light Lp and irradiation of the position check radiation Xc.

The relative position recording means 40 may be arranged to be provided with a first button depression of which instructs irradiation of the position check radiation Xc by the irradiation system 20, a second button depression of which instructs irradiation of the uniform radiation Xb by the irradiation system 20 and a third button depression of which instructs irradiation of the position check light Lp by the position check light irradiation system 30 so that the relative positions of the image portion Gc representing the area irradiated by the position check radiation Xc and the image portion Gp representing the area irradiated by the position check light Lp are recorded on the stimulable phosphor panel 10 by depressing the first to third buttons in a desired order.

In another embodiment, the stimulable phosphor panel 10 is disposed in a predetermined position in the radiotherapy system 100 to receive irradiation of position check light in a visible region having an irradiating position marker from a position check light irradiation means 30 after receiving the irradiation of position check radiation from an irradiation means 20 of the irradiation apparatus 100 and to form a radiation image, and the radiation image is read out by the quality control system 200 to obtain the relation between the irradiating position of the position check radiation and the irradiating position of the position check light in the same manner as described above.

Figure 10:
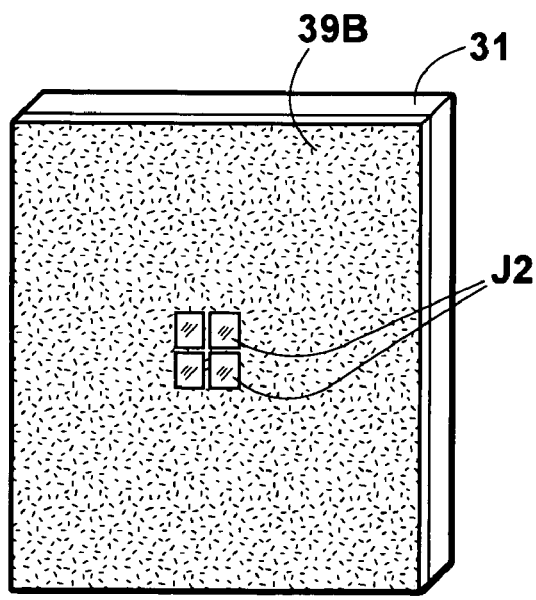
FIG. 10 is a perspective view showing the reflecting mirror provided with the light-shielding mask.

For example, a light-shielding mask 39B provided with a four rectangular openings J2 which are arranged to form a large rectangle having a light-shielding cross is applied to the surface of the reflecting mirror 31 as shown in FIG. 10. The bundle of the position check light Lp reflected by the area of the mirror 31 opposed to the openings J2 is of a rectangle having a cross in cross-section.

Figure 11A:
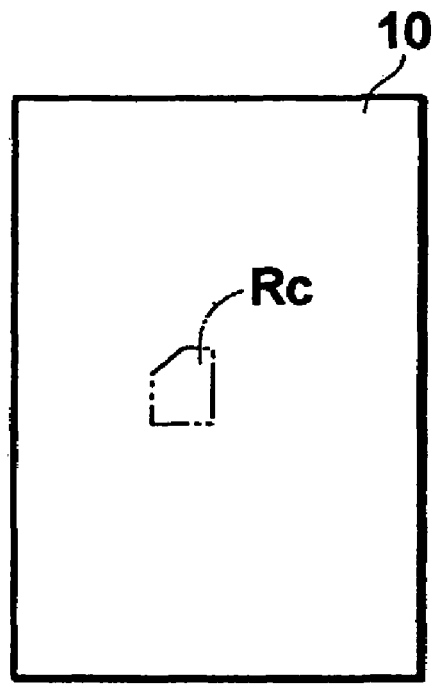
FIGS. 11A and 11B are views showing the areas exposed to the radiation and the visible light recorded on the stimulable phosphor panel.
Figure 11B:
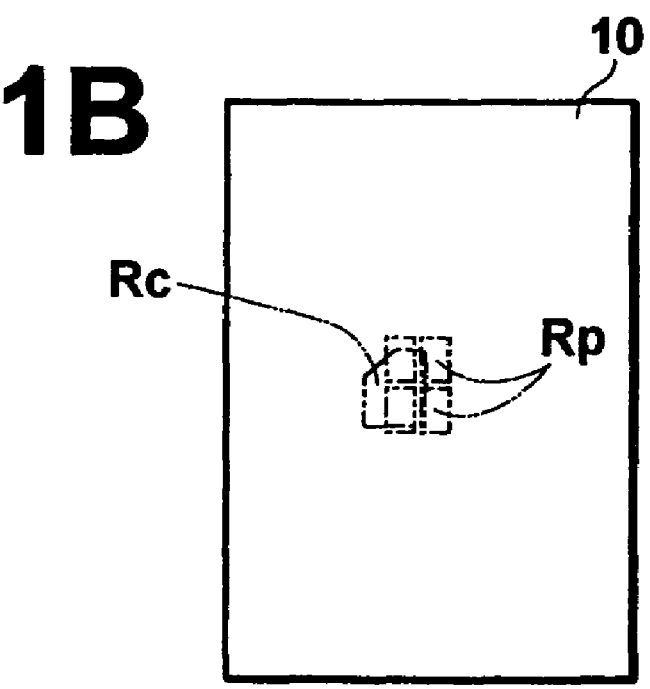

A pentagonal area Rc on the stimulable phosphor panel 10 is exposed to the position check radiation Xc from the irradiation system 20 as shown in FIG. 11A, and a rectangular area Rp having a cross-shaped mark is exposed to the position check light Lp from the position check light irradiation system 30 as shown in FIG. 11B, whereby the relation between the irradiating position of the position check radiation Xc and the irradiating position of the position check light Lp is recorded on the stimulable phosphor panel 10.

The stimulable phosphor panel 10 on which the optical path deviation has been recorded is loaded in the radiation image reading system 201 of the quality control system 200 and the radiation image representing the relative positions is read by the radiation image reading system 201. Then image data representing the radiation image read by the radiation image reading system 201 is output to the relative position obtaining system 202.

Figure 12:
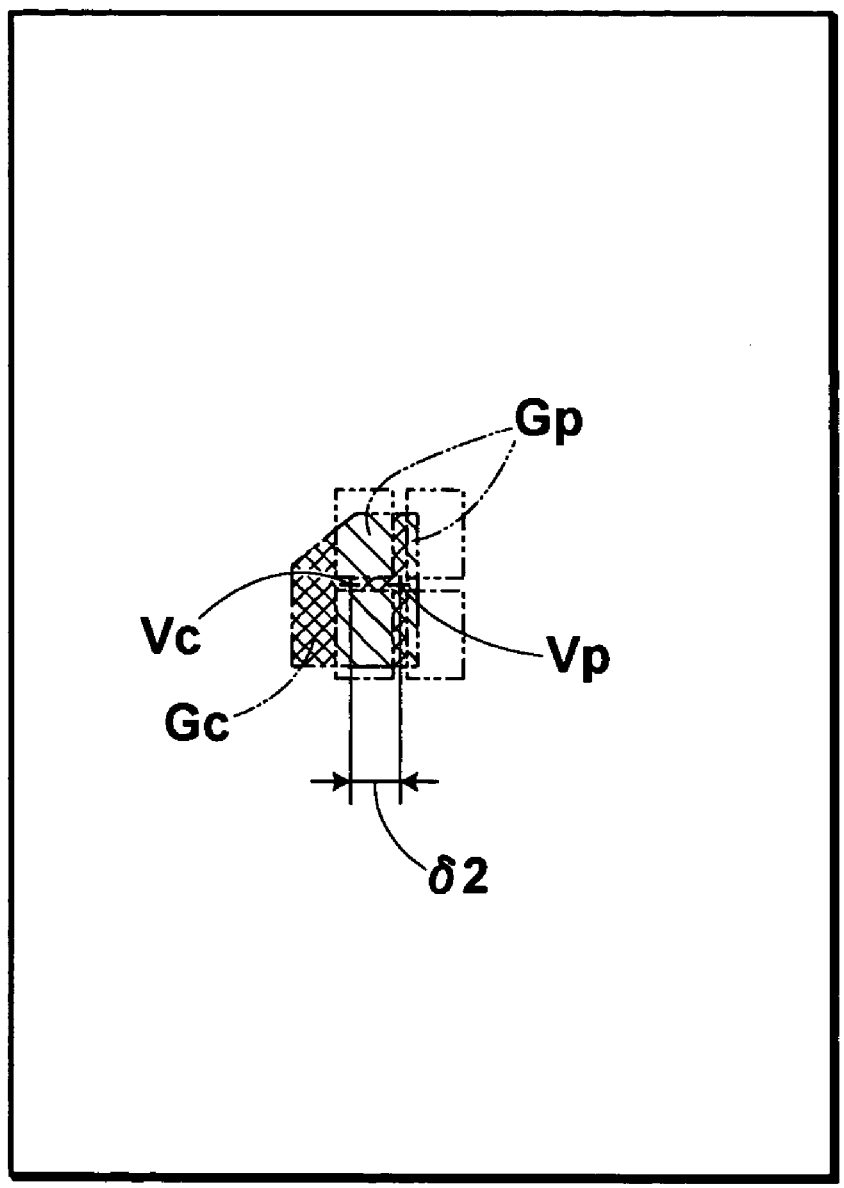
FIG. 12 is a view showing an image read from the stimulable phosphor panel showing the deviation of the irradiating position of the position check light from that of the position check radiation.

The image representing the optical path deviation output to the relative position obtaining system 202 in the form of image data is an image of an image portion Gc representing the area irradiated by the position check radiation Xc and an image portion Gp representing the area irradiated by the position check light Lp overlapping each other as shown in FIG. 12. The relative positions of the center Vc of the image portion Gc representing the area irradiated by the position check radiation Xc and the center Vp of the image portion Gp representing the area irradiated by the position check light Lp represent the optical path deviation. The relative position obtaining system 202 obtains a positional deviation δ2 of the irradiating position of the position check light Lp from the irradiating position of the position check radiation Xc (an example of the relation between the irradiating position of the position check radiation and the irradiating position of the position check light) on the basis of the input radiation image. That is, the space between the centers Vc and Vp is obtained as the positional deviation δ2 as shown in FIG. 12.

The relative position obtaining system 202 further compares the positional deviation δ2 with a predetermined tolerance E. When the former is not larger than the latter, the relative position obtaining system 202 turns on a blue lamp 64 which indicates that it has been confirmed that the position check light Lp from the position check light irradiation system 30 can be used as representing the irradiating position of the position check radiation, and when the former is larger than the latter, the relative position obtaining system 202 gives an alarm by turning on a red lamp 65 which indicates it has been confirmed that the position check light Lp from the position check light irradiation system 30 cannot be used as representing the irradiating position of the position check radiation.

What is claimed is:

1. A quality control system for an irradiation apparatus comprising:

a radiation image reading means which reads out a radiation image from a stimulable phosphor panel which has been disposed in a predetermined position to receive irradiation of position check radiation from an irradiation means and irradiation of uniform radiation from the irradiation means to an area larger than the area exposed to the position check radiation and to receive irradiation of position check light, the position check light being visible, from a position check light irradiation means after receiving the irradiation of the uniform radiation and to form a radiation image, and a relative position obtaining means which obtains the relation between the irradiating position of the position check radiation and the irradiating position of the position check light on the basis of the radiation image read by the radiation image reading means, wherein the radiation image includes a first image of the position check radiation and a second image of the position check light, and the relative position obtaining means obtains the relation between the irradiating position of the position check radiation and the irradiating position of the position check light on the basis of the first image and the second image read by the radiation image reading means.

2. A quality control system for an irradiation apparatus comprising:

a radiation image reading means which reads out a radiation image from a stimulable phosphor panel which has been disposed in a predetermined position to receive irradiation of position check radiation from an irradiation means and irradiation of uniform radiation from the irradiation means to an area larger than the area exposed to the position check radiation and to receive irradiation of position check light, the position check light being visible, from a position check light irradiation means after receiving the irradiation of the uniform radiation and to form a radiation image, and a relative position obtaining means which obtains the relation between the irradiating position of the position check radiation and the irradiating position of the position cheek light on the basis of the radiation image read by the radiation image reading means, wherein the radiation image includes a first image of the position check radiation and a second image of the position check light, the radiation image reading means reads the first image and the second image from the stimulable phosphor panel, and the relative position obtaining means compares a position of the first image and a position of the second image to determine the relation between the irradiating position of the position check radiation and the irradiating position of the position check light.

3. A quality control system for an irradiation apparatus comprising:

a radiation image reading means which reads out a radiation image from a stimulable phosphor panel which has been disposed in a predetermined position to receive irradiation of position cheek light, the position check light being visible, having an irradiating position marker from a position check light irradiation means after receiving an irradiation of position check radiation from an irradiation means and to form a radiation image, and a relative position obtaining means which obtains the relation between the irradiating position of the position check radiation and the irradiating portion of the position check light on the basis of the radiation image read by the radiation image reading means, wherein the radiation image includes a first image of the position check radiation and a second image of the position check light, and the relative position obtaining means obtains the relation between the irradiating position of the position cheek radiation and the irradiating position of the position check light on the basis of the first image and the second image read by the radiation image reading means.

4. A quality control system for an irradiation apparatus comprising:

a radiation image reading means which reads out a radiation image from a stimulable phosphor panel which has been disposed in a predetermined position to receive irradiation of position check light, the position check light being visible, having an irradiating position marker from a position check light irradiation means after receiving an irradiation of position check radiation from an irradiation means and to form a radiation image, and a relative position obtaining means which obtains the relation between the irradiating position of the position check radiation and the irradiating portion of the position check light on the basis of the radiation image read by the radiation image reading means, wherein the radiation image includes a first image of the position check radiation and a second image of the position check light, the radiation image reading means reads the first image and the second image from the stimulable phosphor panel, and the relative position obtaining means compares a position of the first image and a position of the second image to determine the relation between the irradiating position of the position check radiation and the irradiating position of the position check light.

5. A quality control method for reading a stimulable phosphor panel irradiated with position check radiation and visible position check light, the method comprising:

reading a first image of the position cheek radiation and a second image of the position check light from the stimulable phosphor panel;

comparing a position of the first image and a position of the second image to determine a relation between an irradiating position of the position check radiation and an irradiating position of the position check light.

6. The method of claim 5, wherein the comparing the position of the first image and the position of the second image comprises comparing a center of the first image and a center of the second image.

* * * * *